US012645057B1

(12) United States Patent
Ning

(10) Patent No.: US 12,645,057 B1
(45) Date of Patent: Jun. 2, 2026

(54) PANORAMIC LENS

(71) Applicant: Alex Ning, Carlsbad, CA (US)

(72) Inventor: Alex Ning, Carlsbad, CA (US)

( * ) Notice: Subject to any disclaimer, the term of this patent is extended or adjusted under 35 U.S.C. 154(b) by 201 days.

(21) Appl. No.: 18/647,026

(22) Filed: Apr. 26, 2024

Related U.S. Application Data

(60) Provisional application No. 63/498,884, filed on Apr. 28, 2023.

(51) Int. Cl.
| | |
|---|---|
| *G02B 13/06* | (2006.01) |
| *G02B 13/00* | (2006.01) |
| *G02B 13/18* | (2006.01) |
| *G02B 23/24* | (2006.01) |

(52) U.S. Cl.
CPC ......... *G02B 13/06* (2013.01); *G02B 13/0095* (2013.01); *G02B 13/18* (2013.01); *G02B 23/243* (2013.01)

(58) Field of Classification Search
CPC .... G02B 13/06; G02B 13/0095; G02B 13/18; G02B 23/243

USPC ........................................................... 359/725
See application file for complete search history.

(56) References Cited

U.S. PATENT DOCUMENTS

| | | | |
|---|---|---|---|
| 5,764,419 A | 6/1998 | Kodama et al. | |
| 7,023,628 B1 | 4/2006 | Ning | |
| 2001/0012161 A1 | 8/2001 | Nagahara | |
| 2020/0348175 A1 | 11/2020 | Akhitman et al. | |
| 2022/0057612 A1* | 2/2022 | Nagatoshi | G02B 13/16 |
| 2022/0066181 A1 | 3/2022 | Zhang et al. | |
| 2022/0252848 A1 | 8/2022 | Kurtz et al. | |

* cited by examiner

*Primary Examiner* — Wyatt A Stoffa
*Assistant Examiner* — Mitchell T Oestreich

(57) ABSTRACT

An object of the present invention is to create a panoramic lens that is compact, having a lower front diameter to final image circle ratio. Such a lens can be used in space constrained applications such as in endoscopy or other panoramic applications. The lens designs include two lens groups each with multiple lens elements and are scalable. This design can be scaled to a smaller absolute size for space constrained applications, or enlarged to cover an even large image circle. The example designs use all spherical lens elements except a single surface nearest and intermediate focal plane that is located between the two lens groups.

16 Claims, 3 Drawing Sheets

100

100

200

300

PANORAMIC LENS

CROSS REFERENCE TO RELATED APPLICATIONS

This application claims priority to U.S. Provisional application 63/498,884, Panoramic Lens, by the same inventor, filed Apr. 28, 2023.

STATEMENT REGARDING FEDERALLY SPONSORED RESEARCH OR DEVELOPMENT

Not Applicable.

BACKGROUND OF THE INVENTION

Technical Field

The invention relates to panoramic lens systems having a lower front diameter to image circle ratio.

1 RELATED BACKGROUND ART

Panoramic lenses also known as fisheye lenses provide wide angle field of view (FOV) of 120 to 180 degrees or greater. The front lens diameters are typically very large relative to the image circle (size) to. In some cases, the front lens shape is nearly hemispherical. For example, the miniature fisheye lenses disclosed in U.S. Pat. No. 7,023,628 have ratios of front element diameter to the image circle about 2.9× at an angular FOV of 195 deg. When the FOV is further increased to over 200 degrees the ratio of the front element diameter to the image circle will further increase resulting in a lens with large front element. Another example of such a lens is the Nikon 6 mm F/2.8 fisheye U.S. Pat. No. 3,737,214 where the ratio of front element diameter to the image circle is much greater than 2.9×. Other examples include JP2017-068114A, and U.S. Pat. No. 7,161,746B2.

An object of the present invention is to create a panoramic lens having a lower front diameter to image circle ratio. Such a lens can be used in space constrained applications such as in endoscopy or other panoramic applications.

2 BRIEF SUMMARY OF THE INVENTION

The present invention is a panoramic lens assembly comprised of two lens groups, each having positive power. The front group, nearest the object, is a panoramic lens assembly with a field of view (FOV) from 120 degrees to 180 degrees or higher and has a telecentric image space. The exit pupil distance is infinite when image space is telecentric. The telecentricity requirement can be accomplished by having an aperture stop at a suitable location within the front group. Thus, the chief rays at the image space are substantially parallel to the optical axis regardless of the field angle. An intermediate image is formed at the focal plane of the front group. The FOV of view of the front lens group can be easily modified to within the range of 120 to 180 degrees or higher. The rear group is a finite conjugate lens assembly with a magnification ratio greater than unity. A finite conjugate lens images an object plane at a finite distance to an image plane. The ratio of the image size formed at the focal plane of the rear lens group to the object size is the magnification ratio of the panoramic lens assembly. The object space of the rear group is also telecentric. The entrance pupil distance is infinite when object space is telecentric. The chief rays in the object space are substantially parallel to the optical axis regardless of the field position on the object plane. The front group and the rear group are positioned such that the focal or image plane of the front group is at the object plane of the rear group. Two groups are aligned axially. The telecentricity of the two groups ensures that the rays exiting the front group propagate into the rear group with minimal loss. The rear group functions as a relay lens imaging the intermediate image to the focal plane of the rear group. The ratio of the front lens element diameter of the front group to that of the rear group image circle at its focal plane is thus reduced by a factor equal to the magnification of the rear group. Depending on the magnification of the rear group, the image size formed at the focal plane of the rear lens group, and therefore at a sensor, can be as large as the front lens diameter of the front group or even greater.

The two-group with an intermediate image plane will result in a final image which is right side up, not upside down seen in a regular imaging lens. This can be easily corrected by digital processing with modern image signal processors such as ones made by Ambarella Inc. The f/# of the front group will also be increased due to optical invariants. A reduction in F/# can also be compensated by using a sensor with higher electronic gains.

The embodiment lenses of the invention are presented as a number of illustrative examples which are by no means restricting. In the following description, distinction between lens element and lens group is not absolute because a lens group could contain just one lens element and one lens element can be split into a number of weaker elements which function equivalently as the replaced single element. Generally, each disclosed example comprises a number of lens elements which are numerically labeled in increasing order from the left to the right with the left most, nearest the object, being L1. These lenses could logically form into groups which are labeled numerically in increasing order from the left to the right with the left most being the first lens group, G1. Each lens group comprises one or several lens elements. Each lens element has two surfaces. A lens element can be made of glass or plastic materials. The object surface of an element is defined as the surface facing the object space of the lens assembly. In all drawings the object space is on the left side of the lens assembly. The image surface of an element is defined as the lens surface facing the image space of the lens assembly. In all drawings the image space is on the right side of the lens assembly. The image surface is the location of a sensor when the lens assembly is used to detect light coming from an object in object space. Element surfaces can be flat (plano), spherical or aspheric. For an aspheric surface the following equation is used to describe the surface profile:

$$z = \frac{cr^2}{1 + \sqrt{1 - (1+k)c^2 r^2}} + \alpha_1 r^2 +$$
$$\alpha_2 r^4 + \alpha_3 r^6 + \alpha_4 r^8 + \alpha_5 r^{10} + \alpha_6 r^{12} + \alpha_7 r^{14} + \alpha_8 r^{16}.$$

In this equation z is the surface sag at radial distance r from the optical axis. The k is the conic constant. The c is the curvature or inverse of the radius of curvature. The term $\alpha_i$ is the $i^{th}$ polynomial coefficient. Please refer to various lens design publications or Zemax software manual (www.Zemax.com, ZEMAX is a registered trademark of Zemax, LLC) for detailed description of this equation.

3 DETAILED DESCRIPTION OF THE INVENTION

3.1 Embodiment 1

Figure 1:
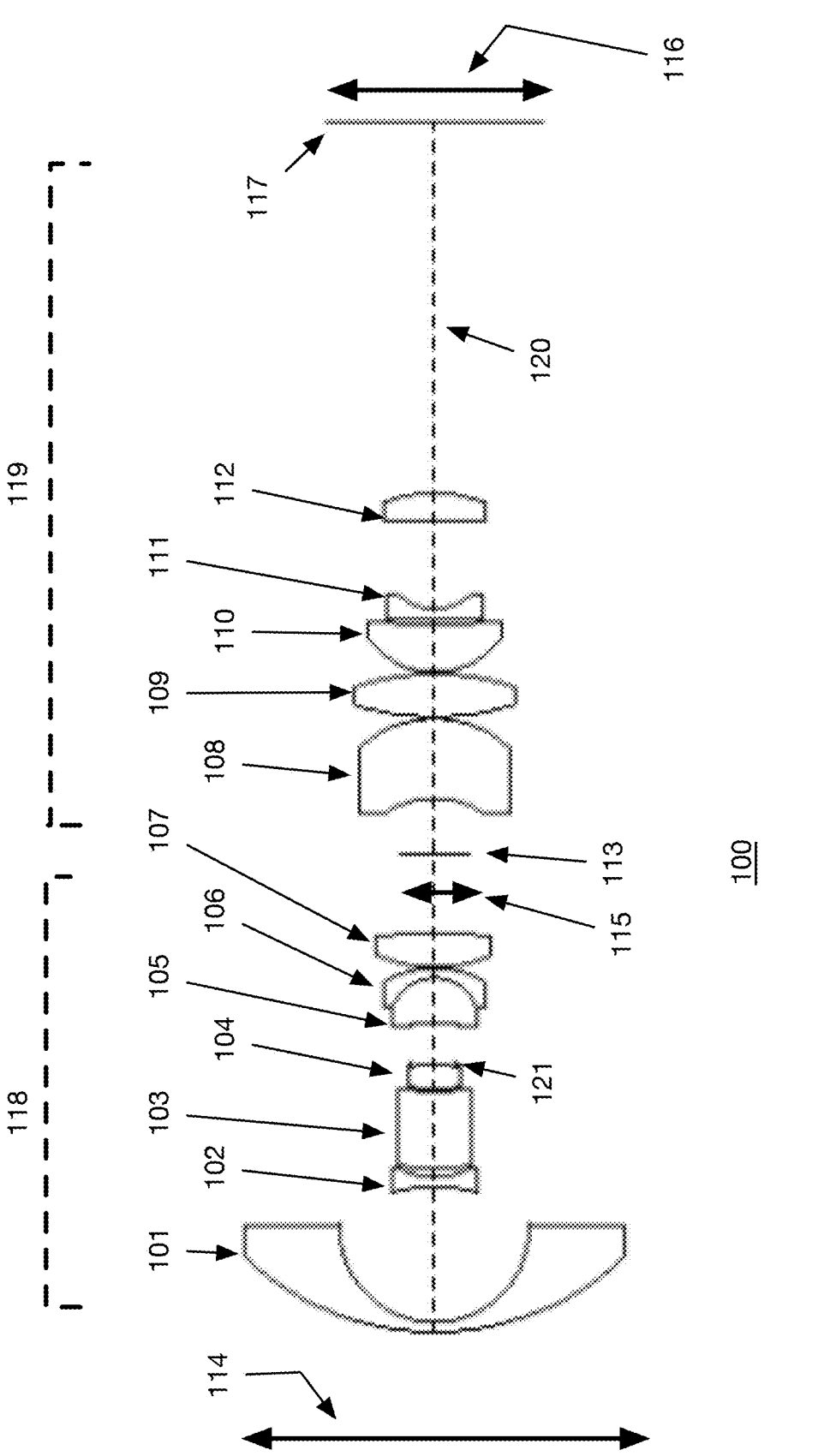
FIG. 1 shows a first embodiment of the invented panoramic Lens.

FIG. 1 illustrates an embodiment of present invention:

Table 1A shows the prescription of this embodiment and Table 1B shows the aspherical coefficients for aspherical surface:

TABLE 1b

Aspherical surface coefficients of the object surface of
Lens 8 (surface 16) of Embodiment 1
Surface 16, lens 8, 108
Aspherical Coefficients

| Term | Value |
|---|---|
| r^2: | 0 |
| r^4: | −0.00156697 |
| r^6: | −0.000157433 |

The front group 118 comprises lens element L1 to L7, 101-107. The vertical line 113 after L7 107 shows the location of the intermediate image plane. The image space of the front group 118 is telecentric. The front element L1, 101 has a diameter 114 of approximately 20 mm with a field of view (FOV) of 230 degrees. The FOV of the front lens element can be within the range of 120 to 180 degrees or higher. The image side of the front lens element of the first

TABLE 1A

| Surface | Type | Radius | Thickness | Nd, Vd | Diameter | Comment |
|---|---|---|---|---|---|---|
| OBJ | STANDARD | Infinity | Infinity | | 0 | |
| 1 | STANDARD | 14.56329 | 0.4979 | 1.910826, 35.255728 | 19.9967 | L1, 101 |
| 2 | STANDARD | 4.952899 | 7.094591 | | 9.903904 | |
| 3 | STANDARD | −8.526566 | 0.4980812 | 1.816001, 46.569210 | 4.543315 | L2, 102 |
| 4 | STANDARD | 3.698695 | 0.4460756 | | 3.775487 | |
| 5 | STANDARD | 8.521286 | 3.983299 | 1.922867, 18.895456 | 3.757734 | L3, 103 |
| 6 | STANDARD | 3.631021 | 0.1791291 | | 2.626293 | |
| 7 | STANDARD | 4.220375 | 1.314345 | 1.922866, 20.882149 | 2.650055 | L4, 104 |
| 8 | STANDARD | −7.039428 | 0.06453474 | | 2.422848 | |
| STO | STANDARD | Infinity | 2.035086 | | 2.279234 | Aperture Stop, 121 |
| 10 | STANDARD | −58.6235 | 2.445403 | 1.729164, 54.669031 | 3.912175 | L5, 105 |
| 11 | STANDARD | −2.366759 | 0.4885952 | 1.922867, 18.895456 | 4.390341 | L6, 106 |
| 12 | STANDARD | −5.582698 | 0.08385388 | | 5.359648 | |
| 13 | STANDARD | 7.852974 | 1.816846 | 1.816001, 46.569210 | 6.000993 | L7, 107 |
| 14 | STANDARD | −19.04088 | 4.057542 | | 5.873581 | |
| 15 | STANDARD | Infinity | 2.966 | | 3.692092 | Intermediate image plane |
| 16 | EVENASPH | −5.253814 | 4.191036 | 1.772500, 49.620227 | 4.94137 | L8, 108 |
| 17 | STANDARD | −5.751261 | 0.09826451 | | 7.949797 | |
| 18 | STANDARD | 14.81897 | 2.238963 | 1.620141, 63.480444 | 8.576931 | L9, 109 |
| 19 | STANDARD | −12.9115 | 0.09792904 | | 8.513515 | |
| 20 | STANDARD | 4.292697 | 2.468254 | 1.772501, 49.613485 | 6.979942 | L10, 110 |
| 21 | STANDARD | 26.07718 | 0.3577403 | | 5.848478 | |
| 22 | STANDARD | 322.6692 | 0.4977459 | 1.922859, 20.884554 | 5.107026 | L11, 111 |
| 23 | STANDARD | 2.767292 | 4.559462 | | 3.803424 | |
| 24 | STANDARD | 482.5664 | 1.494759 | 1.773142, 49.568242 | 4.825362 | L12, 112 |
| 25 | STANDARD | −7.231565 | 19.52436 | | 5.319492 | |
| IMA | STANDARD | Infinity | | | 11.19083 | Final image | lens group, is nearly hemispherical. The intermediate image circle size 115 is about 3.692 mm. The ratio of the front element diameter of the first lens group to the intermediate image circle is 5.4×. The rear group comprises L8 to L12, 108-112. The rear group 119 is a relay lens having a telecentric object space with a magnification ratio of approximately 3×. The image circle 116 of the rear group is approximately 11.19 mm. The ratio of the front lens diameter to the final image size is approximately 1.8×. All lens surfaces are spherical except for the object surface of the first lens 108 of the second lens group.

A right side up image is formed at the final image plane 117. The front group has a F/# approximately 2. With the rear group, the final overall F/# for the lens system 100 is increased to approximately 6.2.

The present invention, and this first embodiment, comprises two lens groups 118, 119, each having positive power. The front group 118 is a panoramic lens assembly with a field of view equal or greater than 120 degrees and having a telecentric image space. The exit pupil distance is infinite for when image space is telecentric. The telecentricity requirement is accomplished by having the front group comprising a first group of lenses 101-104, the aperture stop 121 located as shown, on the image side of lens 4, 104. The remaining lenses 105-107 produce an image at the intermediate image location 113. The chief rays at the image space are substantially parallel to the optical axis 120 regardless of the field angle. The rear group 119 is a finite conjugate lens assembly with a magnification ratio greater than unity, in this particular example 3×. A finite conjugate lens images an object plane at a finite distance to an image plane. The ratio of the image size formed by the rear group to the object size in the intermediate image is the magnification ratio of the panoramic lens. The object space of the rear group is also telecentric. The entrance pupil distance is infinite when object space is telecentric. The chief rays in the object space are parallel to the optical axis. The front group and the rear group are positioned such that the focal or image plane of the front group is at the object plane 113 of the rear group. Both groups 118, 119 are aligned axially. The telecentricity of the two groups ensures that the rays exiting the front group propagate into the rear group with minimal loss. The rear group functions as a relay lens imaging the intermediate image 113 to the focal plane 117 of the rear group. The ratio of the front lens diameter 114 of the front group to that of the rear group image circle 116 is thus reduced by a factor equal to the magnification of the rear group. Depending on the magnification of the rear group, the image size can be as large as the front lens diameter of the front group or even greater.

The Lens design 100 is scalable. This design can be scaled to a smaller absolute size for space constrained applications, or enlarged to cover an even larger image circle. For example, with a 4× reduction the front diameter will be approximately 5 mm with a final image circle of about 2.8 mm. Making this design form suitable for medical endoscopy applications. When a lens is scaled all the ratios and angles remain the same. A scale down design will have the same FOV, and various ratios as the original design.

3.2 Embodiment 2

Figure 2:
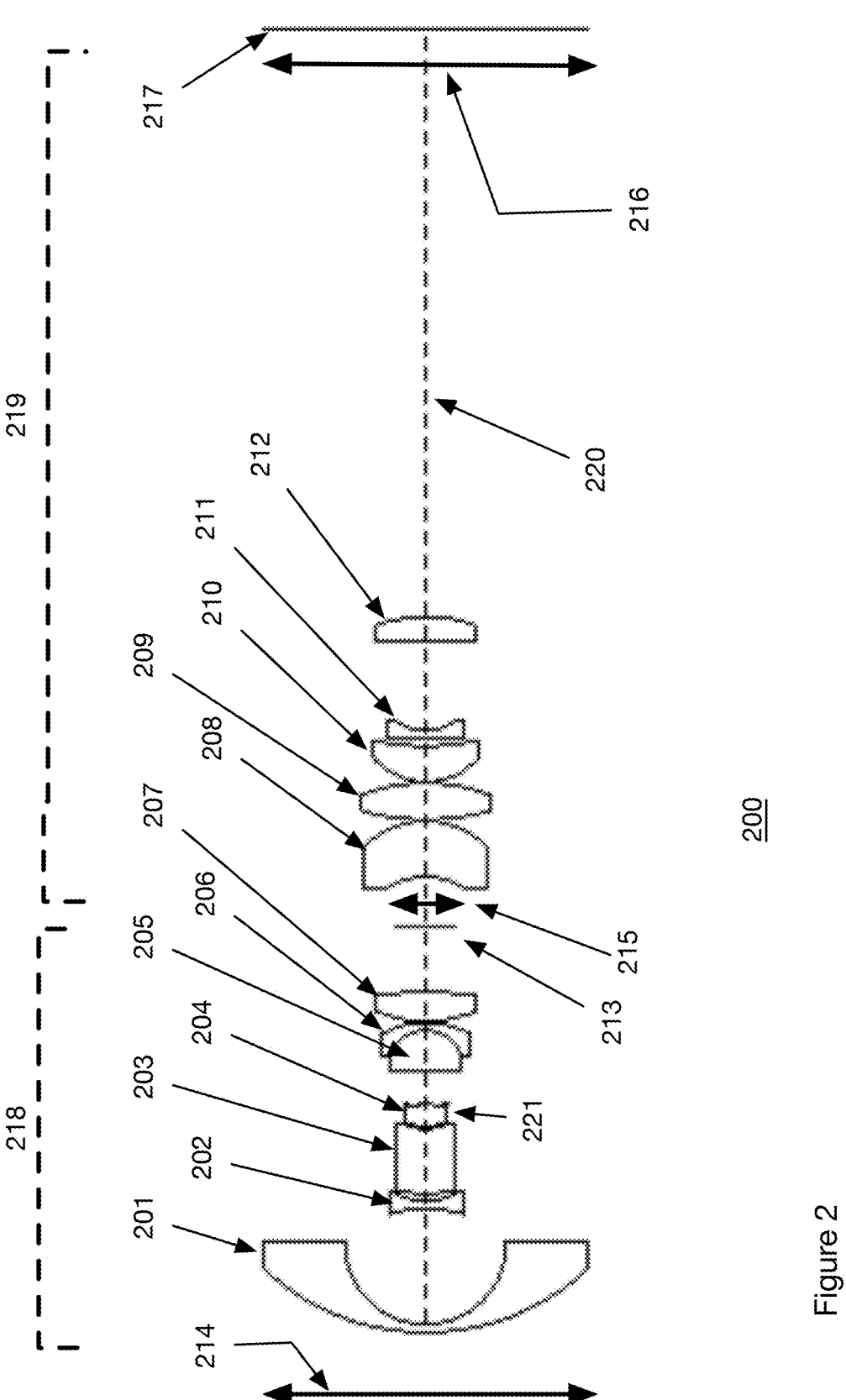
FIG. 2 shows a second embodiment of the panoramic lens that uses the same front group as in FIG. 1.

FIG. 2 illustrates the embodiment 2 of the present invention where the front group 218 remains the same as that of embodiment 1, FIG. 1, 118. The rear group 219 is replaced with a different set of lenses having a higher magnification ratio. The diameter 214 of the front lens of the front group is approximately equal to the image circle 216 of the rear group 219 achieving an overall ratio of approximately 1×.

TABLE 2A

| | | | | | | |
|---|---|---|---|---|---|---|
| shows the prescription of embodiment 2. | | | | | | |
| Surf | Type | Radius | Thickness | Glass | Diameter | Comment |
| OBJ | STANDARD | Infinity | Infinity | | 0 | |
| 1 | STANDARD | 14.56329 | 0.4979 | 1.910826, 35.255728 | 19.9967 | L1, 201 |
| 2 | STANDARD | 4.952899 | 7.094591 | | 9.903904 | |
| 3 | STANDARD | −8.526566 | 0.4980812 | 1.816001, 46.569210 | 4.543315 | L2, 202 |
| 4 | STANDARD | 3.698695 | 0.4460756 | | 3.775487 | |
| 5 | STANDARD | 8.521286 | 3.983299 | 1.922867, 18.895456 | 3.757734 | L3, 203 |
| 6 | STANDARD | 3.631021 | 0.1791291 | | 2.626293 | |
| 7 | STANDARD | 4.220375 | 1.314345 | 1.922866, 20.882149 | 2.650055 | L4, 204 |
| 8 | STANDARD | −7.039428 | 0.06453474 | | 2.422848 | |
| STO | STANDARD | Infinity | 2.035086 | | 2.279234 | Aperture stop, 221 |
| 10 | STANDARD | −58.6235 | 2.445403 | 1.729164, 54.669031 | 3.912175 | L5, 205 |
| 11 | STANDARD | −2.366759 | 0.4885952 | 1.922867, 18.895456 | 4.390341 | L6, 206 |
| 12 | STANDARD | −5.582698 | 0.08385388 | | 5.359648 | |
| 13 | STANDARD | 7.852974 | 1.816846 | 1.816001, 46.569210 | 6.000993 | L7, 207 |
| 14 | STANDARD | −19.04088 | 4.057542 | | 5.873581 | |
| 15 | STANDARD | Infinity | 2.9966 | | 3.692092 | Intermediate image plane, 213 |
| 16 | EVENASPH | −4.746393 | 3.434147 | 1.772500, 49.620227 | 4.927753 | L8, 208 |
| 17 | STANDARD | 5.305082 | 0.09808155 | | 7.447528 | |
| 18 | STANDARD | 14.18059 | 2.234447 | 1.620141, 63.480444 | 8.09777 | L9, 209 |

TABLE 2A-continued shows the prescription of embodiment 2.

| Surf | Type | Radius | Thickness | Glass | Diameter | Comment |
|---|---|---|---|---|---|---|
| 19 | STANDARD | −11.25805 | 0.0984217 | | 8.048474 | |
| 20 | STANDARD | 4.292697 | 2.196317 | 1.772501, 49.613485 | 6.595237 | L10, 210 |
| 21 | STANDARD | 15.51792 | 0.4395732 | | 5.472247 | |
| 22 | STANDARD | 57.91866 | 0.4969938 | 1.922859, 20.884554 | 4.850364 | L11, 211 |
| 23 | STANDARD | 3.0446 | 5.494228 | | 3.785384 | |
| 24 | STANDARD | 3292.096 | 1.511736 | 1.773142, 49.568242 | 5.724053 | L12, 212 |
| 25 | STANDARD | −9.475476 | 36.2078 | | 6.226037 | |
| IMA | STANDARD | Infinity | | | 19.96443 | Final image plane, 217 |

TABLE 2B shows the aspherical coefficients of lens 8, 208 of Embodiment 2
Surface 16 EVENASPH L8

| | |
|---|---|
| Coefficient on $r^2$: | 0 |
| Coefficient on $r^4$: | −0.00119 |
| Coefficient on $r^6$ | −0.00015 |

The front group 218 comprises lens element L1 to L7 201-207 the same as in FIGS. 1, 101-107. The vertical line 213 after L7 207 shows the location of the intermediate image plane. The image space of the front group 218 is telecentric. The front element L1 201 has a diameter of approximately 20 mm with a FOV of 230 degrees. The FOV of the front lens element can be between 120 and 180 degrees or higher. The image side of the front lens element is nearly hemispherical. The intermediate image circle size 215 is about 3.692 mm. The ratio of the front element diameter 214 to the intermediate image circle is 5.4×. The rear group 219 comprises L8 to L12 208-212. The rear group 219 is a relay lens having a telecentric object space with a magnification ratio of approximately 5.4×. The image circle of the rear group is approximately 20 mm. The ratio of the front lens diameter to the final image size is approximately 1×. The magnification of the rear lens group is selected to be the same as the ratio of the front lens element diameter to the diameter of the intermediate image circle. All lens surfaces are spherical except for the object surface of the first lens 208 of the second lens group.

A right side up image is formed at the final image plane. The front group has a F/# approximately 2. With the rear group, the final overall F/# is increased to approximately 11.

The present invention, and this second embodiment, comprises two lens groups 218, 219, each having positive power. The front group 218 is a panoramic lens assembly with field of view equal or greater than 120 degrees and having a telecentric image space. The exit pupil distance is infinite for when image space is telecentric. The telecentricity requirement is accomplished by having the front group comprising a first group of lenses 201-204, the aperture stop 221 located as shown, and on the image side of lens 4, 104. The remaining lenses 205-207 produce an image at intermediate location 213. The telecentricity of the front lens group ensures the chief rays at the image space are parallel to the optical axis 220 within an error of about 7 percent, regardless of the field angle. An intermediate image is formed at the focal plane 213 of the front group. The rear group 219 is a finite conjugate lens assembly with a magnification ratio greater than unity. A finite conjugate lens images an object plane at a finite distance to an image plane. The ratio of the image size to the object size in the intermediate image is the magnification ratio. The object space of the rear group is also telecentric. The entrance pupil distance is infinite when object space is telecentric. The chief rays in the object space are parallel to the optical axis. The front group and the rear group are positioned such that the focal or image plane of the front group is at the object plane 213 of the rear group. Both groups 218, 219 are aligned axially. The telecentric properties of the two groups ensure that the rays exiting the front group propagate into the rear. The rear group functions as a relay lens imaging the intermediate image 213 to the focal plane 217 of the rear group. The ratio of the front lens diameter 214 of the front group to that of the rear group image circle 216 is thus reduced from 5.4× at the intermediate image to 1×, or by a factor equal to the magnification of the rear group. Depending on the magnification of the rear group, the image size can be as large as the front lens diameter of the front group, as in this 2nd embodiment, or even greater.

The Lens design 200 is scalable. This design can be scaled to a smaller absolute size for space constrained applications, or enlarged to cover an even large image circle. For example, with a 4× reduction the front diameter will be approximately 5 mm with a final image circle of about 5 mm also. Making this design form suitable for medical endoscopy applications. When a lens is scaled all the ratios and angles remain the same. A scale down design will have the same FOV, and various ratios as the original design.

3.3 Embodiment 3

Figure 3:
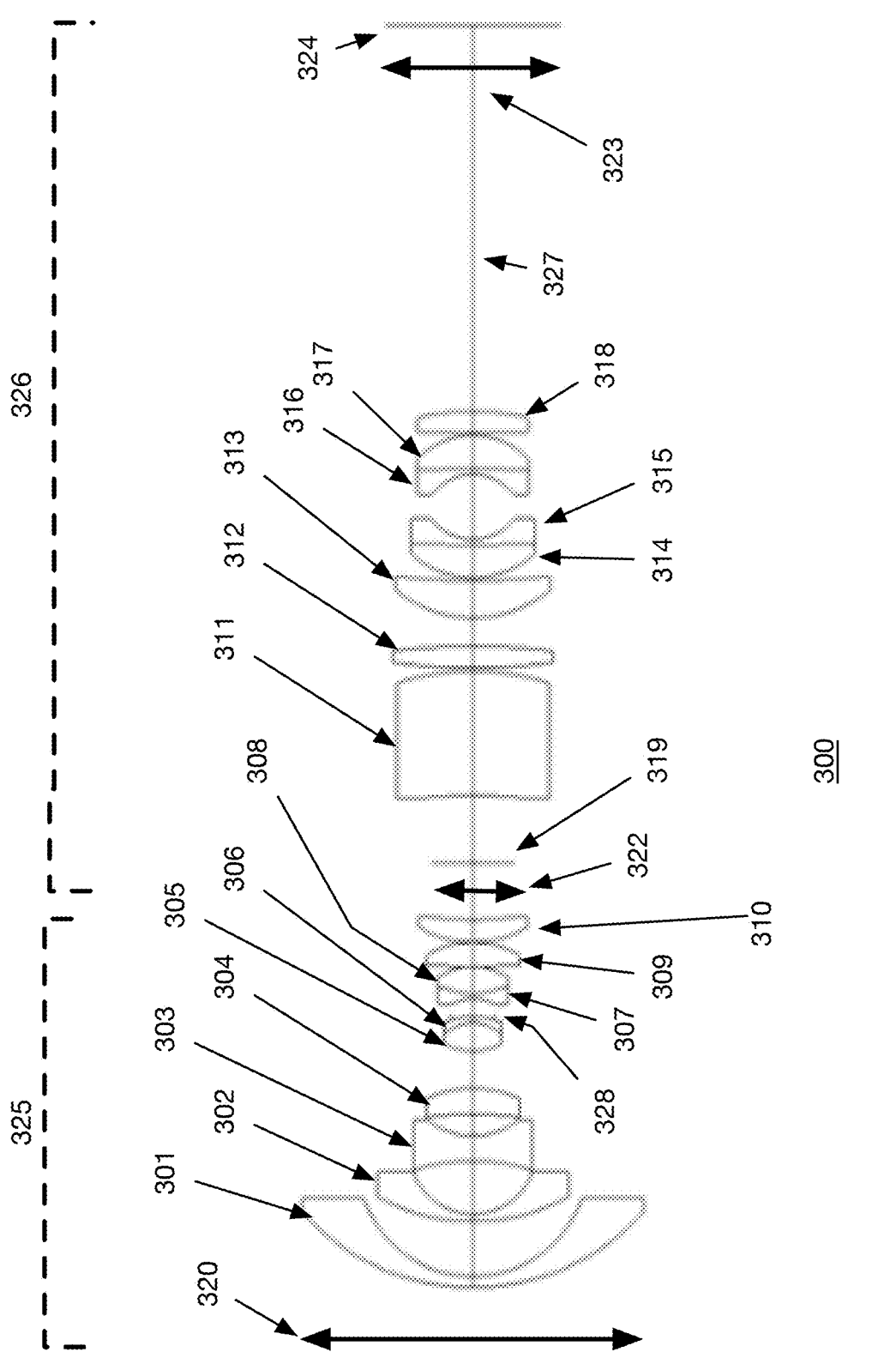
FIG. 3 shows a third embodiment of the panoramic lens that uses different front and rear groups from those in FIGS. 1 and 2 but still falls within the same design space.

FIG. 3 illustrates embodiment 3 according to the present invention:

TABLE 3A shows the prescription for embodiment 3:

| Surf | Type | Radius | Thickness | Glass | Diameter | Comment |
|---|---|---|---|---|---|---|
| OBJ | STANDARD | Infinity | Infinity | | 0 | |
| 1 | STANDARD | 40.89852 | 1.98 | 1.883004, 40.806875 | 60.45337 | L1, 301 |

TABLE 3A-continued shows the prescription for embodiment 3:

| Surf | Type | Radius | Thickness | Glass | Diameter | Comment |
|---|---|---|---|---|---|---|
| 2 | STANDARD | 20.43624 | 9.694465 | | 38.69784 | |
| 3 | STANDARD | 34.52359 | 1.32 | 1.816001, 46.569210 | 34.0182 | L2, 302 |
| 4 | STANDARD | 11.25826 | 9.43446 | | 21.24774 | |
| 5 | STANDARD | −32.82446 | 4.397034 | 1.592824, 68.624378 | 20.88681 | L3, 303 |
| 6 | STANDARD | 12.85874 | 3.77042 | | 16.13811 | |
| 7 | STANDARD | −74.04699 | 4.585136 | 1.945958, 17.943914 | 16.16257 | L4, 304 |
| 8 | STANDARD | −20.42179 | 6.657778 | | 16.5948 | |
| 9 | STANDARD | 10.18289 | 5.013511 | 1.514778, 60.607173 | 10.29788 | L5, 305 |
| 10 | STANDARD | −6.984723 | 0.9950028 | 1.611173, 55.812649 | 9.031259 | L6, 306 |
| 11 | EVENASPH | −13.01391 | 0.1727044 | | 8.431933 | |
| STO | STANDARD | Infinity | 2.990749 | | 7.472004 | Aperture stop, 328 |
| 13 | STANDARD | −9.015758 | 0.9984415 | 1.846666, 23.787324 | 7.738719 | L7, 307 |
| 14 | STANDARD | 12.34056 | 4.77439 | 1.456500, 90.269745 | 9.591893 | L8, 308 |
| 15 | STANDARD | −11.14496 | 0.04676945 | | 12.23288 | |
| 16 | STANDARD | 387.3529 | 4.161581 | 1.592798, 68.327301 | 14.99052 | L9, 309 |
| 17 | STANDARD | −17.00255 | 0.03666942 | | 16.47001 | |
| 18 | STANDARD | 17.89438 | 4.060759 | 1.910826, 35.255728 | 19.24281 | L10, 310 |
| 19 | STANDARD | 62.42468 | 9.916762 | | 18.55936 | |
| 20 | STANDARD | Infinity | 11.993 | | 14.88348 | Intermediate image plane, 319 |
| 21 | STANDARD | −94.16186 | 22.10687 | 1.589130, 61.266803 | 19.61465 | L11, 311 |
| 22 | STANDARD | −40.5299 | 0.4999747 | | 26.9241 | |
| 23 | STANDARD | 111.5525 | 3.82122 | 1.788309, 47.470398 | 28.07941 | L12, 312 |
| 24 | STANDARD | −129.2114 | 5.063276 | | 28.21011 | |
| 25 | STANDARD | 21.65085 | 6.598871 | 1.668816, 57.384440 | 27.51749 | L13, 313 |
| 26 | STANDARD | 124.7734 | 0.5015034 | | 25.99802 | |
| 27 | STANDARD | 16.44473 | 5.775493 | 1.591809, 58.300621 | 22.01273 | L14, 314 |
| 28 | STANDARD | 464.106 | 1.004899 | 1.784701, 26.076811 | 19.93164 | L15, 315 |
| 29 | STANDARD | 9.547528 | 11.4561 | | 14.99312 | |
| 30 | STANDARD | −9.19493 | 0.9996056 | 1.647693, 33.842283 | 14.46213 | L16, 316 |
| 31 | STANDARD | −113.085 | 5.899838 | 1.753930, 52.270764 | 18.0133 | L17, 317 |
| 32 | STANDARD | −13.53529 | 0.4959151 | | 19.65225 | |
| 33 | STANDARD | 430.5421 | 3.782804 | 1.810000, 40.925014 | 19.62116 | L18, 318 |
| 34 | STANDARD | −41.20188 | 68.33 | | 19.64623 | |
| IMA | STANDARD | Infinity | | | 30.81989 | Final image plane, 324 |

TABLE 3b shows the aspherical coefficients of the image surface
of lens 6, 306 of Embodiment 3:

| Surface 11 EVENASPH | |
|---|---|
| Coefficient on $r^2$ : | 0 |
| Coefficient on $r^4$ : | 6.31E−05 |
| Coefficient on $r^6$ : | −1.63E−06 |

The front group 325 comprises lens element L1 to L10, 301-310. The vertical line after L10, 310 shows the location of the intermediate image plane 319. The image space is telecentric. The front element L1 has a diameter of approximately 60.45 mm with a FOV of 230 degrees. The front lens element 301 is nearly hemispherical. The intermediate image circle 319 size is about 14.88 mm. The ratio of the front element diameter 320 to the intermediate image circle is 4×. The rear group 326 comprises L11 to L18 311-318. The rear group 326 is a relay lens having a telecentric object space with a magnification ratio of approximately 2×. The image circle of the rear group 323 is approximately 30.8 mm. The ratio of the front lens diameter to the final image size is approximately 2×. All lens surfaces are spherical except for the image surface of the last lens 310 of the first lens group.

A right side up image is formed at the final image plane. The front group has a F/# approximately 2. With the rear group, the final overall F/# is increased to approximately 3.9.

The present invention, and this third embodiment, comprises two lens groups 325, 326, each having positive power. The front group 325 is a panoramic lens assembly with FOV equal or greater than 120 degrees and having a telecentric image space. The exit pupil distance is infinite for when image space is telecentric. The telecentricity requirement is accomplished by having the front group comprising a first group of lenses 301-305, the aperture stop 328 located as shown, on the image side of lens 6, 306. The remaining lenses 307-310 produce an intermediate image at location 319. Thus, the chief rays at the image space are substantially parallel to the optical axis 327 regardless of the field angle. An intermediate image is formed at the focal plane 319 of the front group. The rear group 326 is a finite conjugate lens assembly with a magnification ratio greater than unity, in this example 2×. A finite conjugate lens images an object plane at a finite distance to an image plane. The ratio of the image size to the object size in the intermediate image is the magnification ratio. The object space of the rear group is also telecentric. The entrance pupil distance is infinite when object space is telecentric. The chief rays in the object space are parallel to the optical axis. The front group and the rear group are positioned such that the focal or image plane of the front group is at the object plane 319 of the rear group. Both groups 325, 326 are aligned axially. The telecentricity of the two groups ensures that the rays exiting the front group propagate into the rear group. The rear group functions as a relay lens imaging the intermediate image 319 to the focal plane 324 of the rear group. The ratio of the front lens diameter 320 of the front group to that of the rear group image circle 323 is thus reduced by a factor equal to the magnification of the rear group. Depending on the magnification of the rear group, the image size can be as large as or larger than the front lens diameter. A rear lens group magnification of 4× produces a final image from the rear lens group that is the same size as the front lens element diameter, Higher magnification produces an image larger than the diameter of the front lens element.

The Lens design 300 is scalable. This design can be scaled to a smaller absolute size for space constrained applications or enlarged to cover an even large image circle. When a lens is scaled all the ratios and angles remain the same. A scaled design will have the same FOV, and various ratios as the original design.

What is claimed:

1. A panoramic lens assembly, the panoramic lens assembly having an optical axis and comprising in order from object to image:

a) a first, positive power, lens group that has a front lens element nearest an object, the front lens element having a diameter, and the first lens group, is image space telecentric, and, forms an image of the object at an intermediate focal plane, the image of the object at the intermediate focal plane having a diameter, and, b) a second, positive power, finite conjugate, lens group, that is object space telecentric and has an object plane, a focal plane, and a magnification, and, c) the first lens group and second lens group each have an optical axis and the optical axes of the first lens group and the second lens group are aligned along the optical axis of the panoramic lens assembly, and, d) the first lens group and the second lens group are positioned such that the intermediate focal plane is located at the object plane of the rear second lens group, and, e) the second lens group is as a relay lens, the image of the object formed at the intermediate focal plane is focused onto the focal plane of the second lens group, and, f) The image on the focal plane of the second lens group has a diameter that is equal to the diameter of the image of the object formed at the intermediate focal plane multiplied by the magnification of the second lens group, and, g) all surfaces of all lens elements are spherical surfaces except a first surface, nearest the intermediate focal plane, of the second lens group is aspherical.

2. The panoramic lens assembly of claim 1 wherein the front lens element has a field of view greater than 120 degrees.

3. The panoramic lens assembly of claim 1 wherein the front lens element of the front group has a field of view greater than 180 degrees.

4. The panoramic lens assembly of claim 1 wherein the magnification of the second lens group is selected such that the diameter of an image circle formed at the focal plane of the second lens group is equal to the diameter of the front lens element of the first lens group.

5. The panoramic lens assembly of claim 1 wherein the magnification of the second lens group is selected such that the ratio of the diameter of the front lens element of the front group to the diameter of an image circle formed at the focal plane of the second lens group to is less than or equal to 2.

6. The panoramic lens assembly of claim 1 wherein the ratio of the diameter of the front lens element of the first lens group to the diameter of the image of the object at the intermediate focal plane is 5.4 and the magnification of the second lens group is selected such that the ratio of the diameter of the front lens element of the front group to the diameter of the image formed at the focal plane of the second lens group is between 1 and 2.

7. The panoramic lens assembly of claim 1 wherein the ratio of the diameter of the front lens element of the first lens group to the diameter of the image of the object at the intermediate focal plane is 4 and the magnification of the second lens group is selected such that the ratio of the diameter of the front lens element of the front group to the diameter of the image formed at the focal plane of the second lens group is 1.

8. The panoramic lens assembly of claim 1 wherein the magnification of the rear lens group is selected to be the same as the ratio of the front lens element diameter to the diameter of the intermediate image circle.

9. A panoramic lens assembly, the panoramic lens assembly having an optical axis and comprising in order from object to image:

a) a first, positive power, lens group that has a front lens element nearest an object, the front lens element having a diameter, and the first lens group, is image space telecentric, and, forms an image of the object at an intermediate focal plane, the image of the object at the intermediate focal plane having a diameter, and, b) a second, positive power, finite conjugate, lens group, that is object space telecentric and has an object plane, a focal plane, and a magnification, and, c) the first lens group and second lens group each have an optical axis and the optical axes of the first lens group and the second lens group are aligned along the optical axis of the panoramic lens assembly, and, d) the first lens group and the second lens group are positioned such that the intermediate focal plane is located at the object plane of the second lens group, and, e) the second lens group is as a relay lens, the image of the object formed at the intermediate focal plane is focused onto the focal plane of the second lens group, and, f) the image on the focal plane of the second lens group has a diameter that is equal to the diameter of the image of the object formed at the intermediate focal plane multiplied by the magnification of the second lens group, and, g) all surfaces of all lens elements are spherical surfaces except a last surface, nearest the intermediate focal plane, of the first lens group, is aspherical.

10. The panoramic lens assembly of claim 9 wherein the front lens element has a field of view greater than 120 degrees.

11. The panoramic lens assembly of claim 9 wherein front lens element of the front group has a field of view greater than 180 degrees.

12. The panoramic lens assembly of claim 9 wherein the magnification of the second lens group is selected such that the diameter of an image circle formed at the focal plane of the second lens group is equal to the diameter of the front lens element of the first lens group.

13. The panoramic lens assembly of claim 9 wherein the magnification of the second lens group is selected such that the ratio of the diameter of the front lens element of the front group to the diameter of an image circle formed at the focal plane of the second lens group to is less than or equal to 2.

14. The panoramic lens assembly of claim 9 wherein the ratio of the diameter of the front lens element of the first lens group to the diameter of the image of the object at the intermediate focal plane is 5.4 and the magnification of the second lens group is selected such that the ratio of the diameter of the front lens element of the front group to the diameter of the image formed at the focal plane of the second lens group is between 1 and 2.

15. The panoramic lens assembly of claim 9 wherein the ratio of the diameter of the front lens element of the first lens group to the diameter of the image of the object at the intermediate focal plane is 4 and the magnification of the second lens group is selected such that the ratio of the diameter of the front lens element of the front group to the diameter of the image formed at the focal plane of the second lens group is 1.

16. The panoramic lens assembly of claim 9 wherein the magnification of the rear lens group is selected to be the same as the ratio of the front lens element diameter to the diameter of the intermediate image.

* * * * *